(12) United States Patent
Meily et al.

(10) Patent No.: X8037
(45) Date of Patent: Mar. 1, 1834

(54) LOOM,WEAVING, COVERLETS, &C.

(76) Inventors: Emanuel Meily Jr.; John Mellinger; Samuel Mellinger

Emanuel Meily Jr. John Mellinger and Samuel Mellinger

The Schedule referred to in these Letters Patent and making part of
the same, containing a description in the words of the said Emanuel
Meily Jr. John Mellinger and Samuel Mellinger themselves
of their Improvements in the Loom or Machine for Weaving Cover-
lids, carpets, Diapers, and other kinds of fancy work, —

---

To all whom it may concern, Be it known that we Emanuel
Meily Jr. John Mellinger and Samuel Mellinger of the Borough
of Lebanon in the County of Lebanon, and the State of Penn-
sylvania, have invented certain improvements in the loom or
machine for weaving coverlids, carpets, Diapers and other kinds
of fancy work and we do hereby declare that the following is a full and
exact description thereof, reference being had to the drawings which
accompany and make part of this specification. In many
respects this machine resembles that in common use, but by
means of the improvements which we have made one pattern
card, answers the same purpose with two on the old plan, in
consequence of which but one half of the number formerly used are
are required by us. A. A. Fig. 1. is the ordinary frame of the loom.
B. C. D. E. are treadles, when the foot is placed upon the treadle
B. and it is forced down, a line or cord leading from it and
connected with the lever F. draws one end of it down, and rai-
ses the other, which is attached to the figure heddles and of
course raises them, at the same time that these are raised,
one half of the binders are raised also, the cord being attached to
the lever, which works the binders as shown in the drawing.
The next treadle operates in a similar manner upon the other
half of the binders. The dotted lines at G. represent the cords by
which the attachment to the figure heddles is formed, and
also the end of the sliding piece which catches the hooks in rai-
sing the figure heddles. The projecting iron rod H. having a
friction wheel at its end, is attached to the sliding piece, and of course rises with it. In so doing the friction roller is brought
into contact with the curved spring piece I. the lower end of which
is attached to what we call the swinging frame J. These parts are
all double, that is they are repeated at the opposite end, and of
course are not seen in the drawing. The needle beam K. turns in
the swinging frame. Upon the swinging frame there is a cam L. which
catches upon pins upon the wheel M. there being four such pins.
at equal distances apart. the cam is shown in the drawing as act-
ing upon one of them, and the needle beam as in operation with the
pattern cards. when the swinging frame is thrown forward the
cam L. catches upon the next pin. not seen in the drawing, being
hidden by the swinging frame, the needle beam is of course turned one fourth
of the way round at every other forward swing of the swinging frame.
Behind the wheel M. and on the same shaft with it there is
what we denominate the oval wheel. These two wheels are shown in Fig 2 M. being the round and N. the oval wheel.
The hooks O & P. the round and oval wheels are solely intended
to operate upon the needle beam. The situation in which the hooks
O & P. stand in the drawing results from their being separated by
the contact of the longest diameter of the oval wheel. When the
swinging frame moves forward being set ~~in motion~~ into operation by one of the
figure treadles, the needle beam and pattern cards on it, remain
in the same situation: in the return of the swinging frame, the cam
L catches one of the pins on the round wheel M. before mentioned,
and turns both wheels one fourth round and consequently the upper
hook O, falls upon the shortest diameter of the oval wheel, and
at its extremity takes hold of the needle beam, at the second
swinging forward of the swinging frame being set into ~~motion~~ operation by
the other figure treadle, the needle beam being held by the hook
O. of course turns round one fourth and presents a new pattern
card towards the needles. A cord Q. connects the outer ends of
the two hooks O & P. The weight R. has a cord attached to it
which passes over a pulley at the upper part of the machine and
is connected with the hooks O & P as seen in the drawing —
(D) When When the workman has proceeded with his work to the centre of the
pattern, whilst the weight R. was hanging upon a pin, being inop-
erative, and wishes to weave the rest of his pattern in the reverse or-
der, all he has to do is to take the weight R. off of the pin: let its grav-
ity take hold of the cord which will then raise the two hooks O & P. up
and now whereas the upper hook O did before operate upon the
needle beam. now the lower hook takes hold of the needle beam and
throws it one fourth round in the reversed order and also pre-
sents the pattern — cards towards the needles in the reversed order.
We carry the pattern cards out by spanning them over
friction rollers as shown at S & T. we also place a loose roller
U. in the doubling of the pattern cards which keeps them in a
proper state of tension, and causes to work with regularity. In
our first specification we omitted to describe an improved mode
adopted, and then used by us, of preparing the pattern cards.
The usual method of doing this is to place the pasteboard of which
the cards are made, between two pieces of metal similarly per-
forated, and to punch them with solid round punches. Instead
of this we take a single plate usually of metal, and confine it
upon a block of wood, resting upon the end grain thereof. we
then cut the pasteboard, placed between the plate and the
wood, by means of a hollow punch. This punch has a wire
passing through its hollow, or barrel, coiled into a spiral
spring so as to push out the pieces as they are cut. This ar-
rangement is shown at Fig 3. and needs no further descrip-
tion. This machinery may be variously modified and arranged,
whilst the same general principles, or modes of action
as those upon which our improvements are dependant, may
be substantially retained. in claiming certain things as our
invention. therefore it is to be understood that we do not intend
to limit ourselves to the precise modes and forms by us set
forth. but to vary the same, in any way we may deem prop-
er. whilst the same results are attained by analogous
means.

means. We claim as our invention the general arrangement of the parts connected with the round and oval wheels, as here-in described, for the purpose of operating upon the needle shaft, in the manner, and for the purposes set forth. We claim the manner of carrying out the pattern cards, by means of friction rollers, and the steadying the same by means of a loose roller in the doubling thereof. We claim also the mode described of preparing the pattern cards upon a block of wood by means of a hollow punch and cleaver operated upon by a spring.

Witnesses
Geo: Glein
Henry Dehuff

Emanuel Meily Jr
John Mellinger
Samuel Mellinger

Exd [illegible]

(1246 words)

Drawing (Rec.d 24. April 1837. & Recorded anew — )